(12) United States Patent
Bowen

(10) Patent No.: US 7,855,715 B1
(45) Date of Patent: Dec. 21, 2010

(54) SWITCH WITH DEPTH AND LATERAL ARTICULATION DETECTION USING OPTICAL BEAM

(76) Inventor: James Harrison Bowen, 110 Corporate Dr., Elizabeth City, NC (US) 27909

( * ) Notice: Subject to any disclaimer, the term of this patent is extended or adjusted under 35 U.S.C. 154(b) by 1385 days.

(21) Appl. No.: 11/189,957

(22) Filed: Jul. 27, 2005

(51) Int. Cl.
*G09G 5/00* (2006.01)

(52) U.S. Cl. .................. 345/168; 345/170; 400/492

(58) Field of Classification Search .............. 400/492; 345/156, 168, 170
See application file for complete search history.

(56) References Cited

U.S. PATENT DOCUMENTS

| | | | |
|---|---|---|---|
| 3,758,785 A * | 9/1973 | Maute ..................... 250/229 |
| 3,886,544 A * | 5/1975 | Narodny ................... 341/31 |
| 3,892,915 A * | 7/1975 | Budworth et al. ........... 178/21 |
| 3,906,222 A * | 9/1975 | Astier et al. ............... 250/229 |
| 4,013,342 A * | 3/1977 | Narodny .................. 385/18 |
| 4,029,915 A * | 6/1977 | Ojima ..................... 708/145 |
| 4,223,217 A * | 9/1980 | Bongard et al. ......... 250/227.22 |
| 4,362,934 A | 12/1982 | McLey |
| 4,479,111 A * | 10/1984 | Madsen et al. ............. 341/27 |
| 4,480,184 A * | 10/1984 | Ely ..................... 250/227.22 |
| 4,536,625 A * | 8/1985 | Bebie ..................... 200/5 A |
| 4,597,681 A * | 7/1986 | Hodges .................... 400/488 |
| 4,617,461 A * | 10/1986 | Subbarao et al. ........... 250/229 |
| 5,237,123 A | 8/1993 | Miller |
| 5,278,557 A | 1/1994 | Stokes et al. |
| 5,300,926 A * | 4/1994 | Stoeckl .................... 345/157 |
| 5,502,460 A | 3/1996 | Bowen |
| 5,505,115 A * | 4/1996 | Vandervoort ............ 84/423 R |
| 5,528,235 A | 6/1996 | Lin et al. |
| 5,557,057 A | 9/1996 | Starr |
| 5,567,902 A | 10/1996 | Kimble et al. |
| 5,619,003 A | 4/1997 | Hotz |
| 5,644,338 A | 7/1997 | Bowen |
| 5,729,754 A * | 3/1998 | Estes ..................... 712/15 |
| 5,841,374 A * | 11/1998 | Abraham .................. 341/34 |
| 5,889,507 A | 3/1999 | Engle et al. |
| 6,204,839 B1 | 3/2001 | Mato, Jr. |
| 6,705,783 B1 | 3/2004 | Bowen |
| 6,853,366 B2 | 2/2005 | Bowen |
| 7,378,991 B2 * | 5/2008 | Dietz et al. ................ 341/22 |
| 2002/0041784 A1 * | 4/2002 | Thomas .................... 400/472 |
| 2003/0044215 A1 | 3/2003 | Monney et al. |
| 2004/0100447 A1 * | 5/2004 | Ozolins ................... 345/170 |
| 2005/0057515 A1 | 3/2005 | Bathiche |
| 2005/0087061 A1 * | 4/2005 | Sim et al. ................. 84/719 |

* cited by examiner

*Primary Examiner*—Amare Mengistu
*Assistant Examiner*—Gene W Lee

(57) ABSTRACT

A key switch to sense and give feedback to a computer of depth, acceleration, velocity, and lateral or vibrato movement. The key switch is suitable for computer keyboards, musical keyboards, foot pedals and the like. Lateral or sideward key movements can be for mouse functions or multi code output from multi directional key movement from one key outputting a single key code or key sequences.

26 Claims, 16 Drawing Sheets

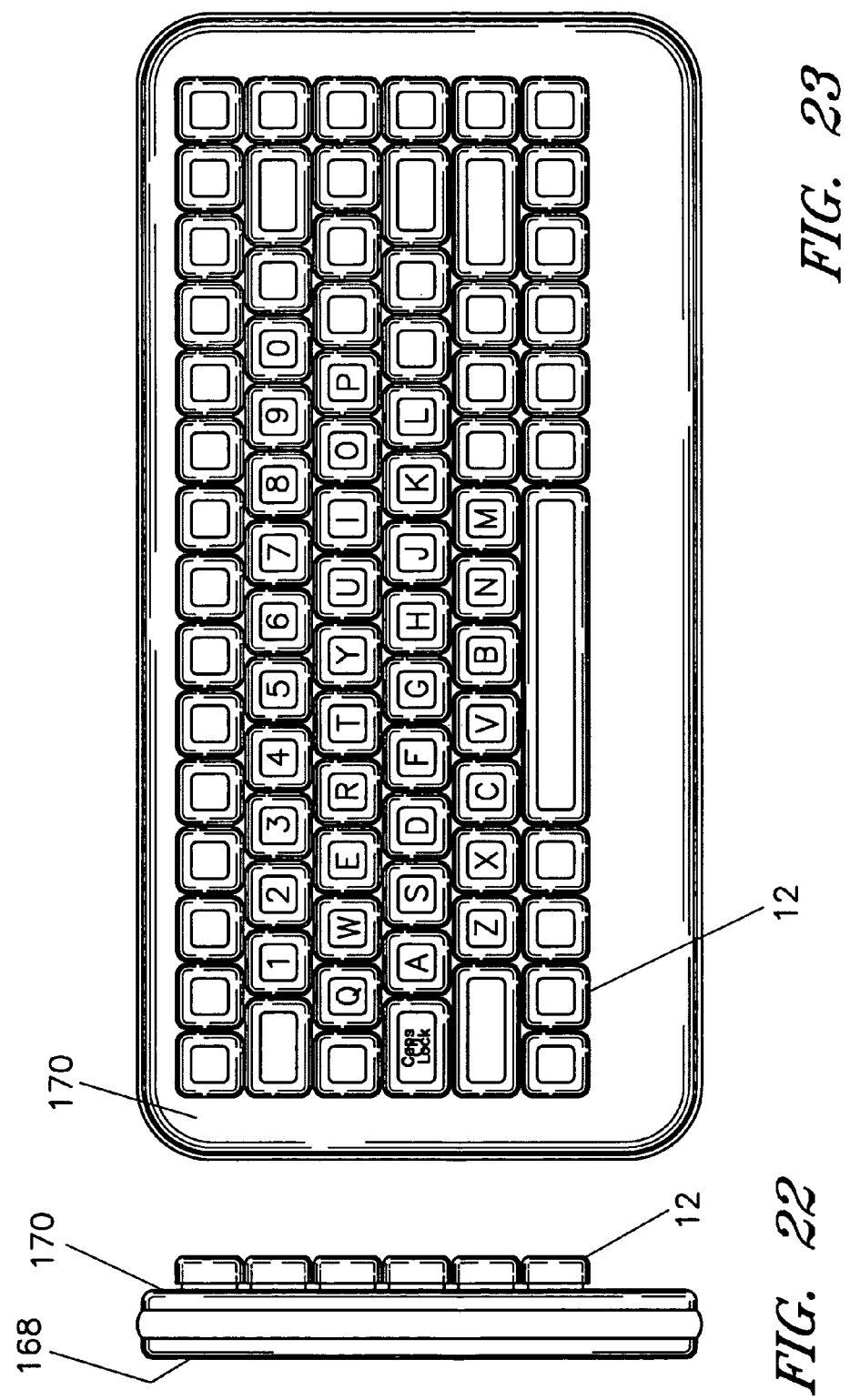

SWITCH WITH DEPTH AND LATERAL ARTICULATION DETECTION USING OPTICAL BEAM

CROSS-REFERENCES TO RELATED PATENTS

Design of the optical switch with depth and lateral articulation used in the practice of this invention can be as disclosed in U.S. Pat. Nos. 6,705,783, 6,853,366, 5,502,460 and 5,644,338 in which are herein incorporated by reference.

BACKGROUND OF THE INVENTION

1. Field of the Invention

The present invention generally relates to a rugged switch to be used in musical keyboards, computer keyboards, foot switches and the like wherein the sensing means in rugged applications is not below the switch operating means to be damaged by operator finger pressure.

2. Description of the Prior Art

Musical keyboard are being manufactured with force sensing resistors (FSR) to enable the musician to press hard and play loud notes and to press soft to play soft notes. See, for example, U.S. Pat. No. 5,619,003 to Hotz.

Microsoft patent application publication US2005/0057515, Mar. 17, 2005 shows a FSR below each key position on a computer keyboard to be used to show the force applied, and discloses this applied force can be used for various functions in operating a computer.

U.S. Pat. No. 5,278,557, Stokes et al, shows a cursor positioning feature using FSR's as a strain gage.

Compaq U.S. Pat. No. 6,204,839 dated Mar. 20, 2001 discloses a force sensing computer keyboard using capacitive technology to be used for various functions in operating a computer. It also discloses that by moving your fingers across the top of the keys in a direction, the cursor will follow.

Foot switches are being manufactured with variable resistors to vary the speed of motors and other industrial equipment.

U.S. Pat. No. 5,528,235 to Lin et al., shows a key that can be depressed on each of its four sides to give an output.

SUMMARY OF THE INVENTION

It is therefor the primary objective of this invention in rugged applications to have an optical sensor with a sensing means for a switch position that is not in contact or beneath the switch stem being positionally sensed making the operation of the switch rugged and impervious to a striking or operating force.

It is a further objective of this invention to have an optical sensor sense the position of the depth of the key and in the process of getting to a depth, have lateral articulation to enable a multiple directional selection of various computer input functions.

It is a further objective of this invention to provide an arrangement where key position can be measured independent of pressure, or with a pressure that is comfortable to an operator and which is not dependent on a force sensing element requirement, which can be a problem with handicapped persons that cannot apply suitable pressure to a force sensing element.

It is a further objective of this invention when used as a musical instrument to detect the depth position of a key against a spring or rubber pad, or the like to give resistance in the downward position to vary amplitude of a note.

It is a further object of this invention when being used in a musical instrument when the key is in a downward position the key can be articulated in a bilateral direction to modify the note or give a vibrato effect.

It is a further object of this invention when used in non-rugged applications to have force sensing elements to detect depth and lateral articulation.

It is a further object of the invention to be used in plurality in at least a computer keyboard, a dual function computer/musical keyboard or a musical keyboard.

It is a further object of this invention to allow a foot switch with multiple directional outputs when being used for musical, computer or industrial applications, and when varying the multiple directional outputs emit no electrical noise.

Briefly, this invention contemplates having a least one key cap and key interrupter or stem disposed through a pivot and sliding surface wherein the stem is banked by at least one optically emitter detector pair with a optical beam there between. The key interrupter blocks or partially blocks the optical beam giving key location detection thus eliminating contact with the sensing means. The key can then be articulated in a lateral or sideward direction to vary the optical beam emission to the detector to input computer commands or when used to play music either on a qwerty type keyboard or musical keyboard to give a vibrato effect.

BRIEF DESCRIPTION OF THE DRAWINGS

The foregoing and other objects, aspects and advantages will be better understood from the following detailed description of the invention with reference to the drawings, in which:

FIG. 22 is a side view of a keyboard with optical key detection in accordance with the teachings of this invention;

FIG. 23 is a plan view of a keyboard with optical key detection in accordance with the teachings of this invention;

DETAILED DESCRIPTION OF THE INVENTION

Figure 1:
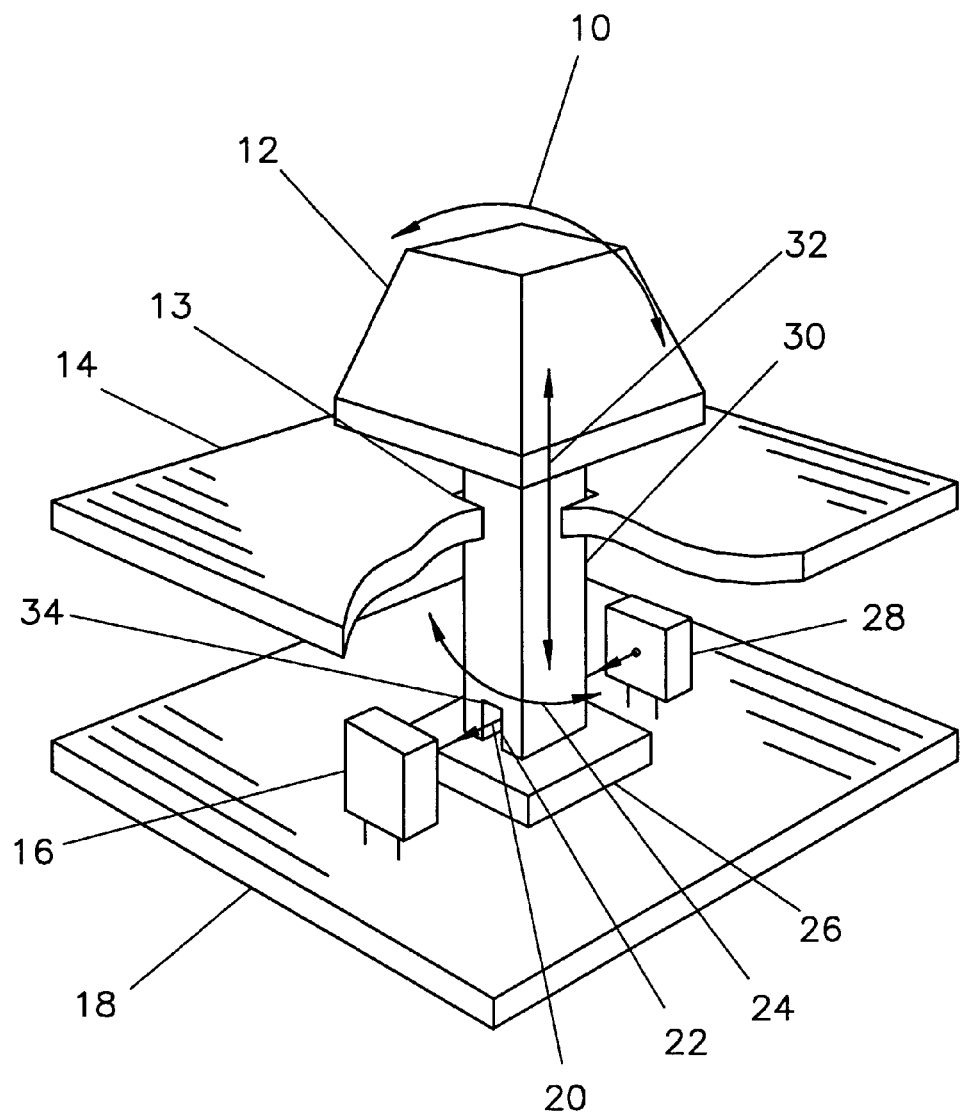
FIG. 1 is an isometric view of an optical switch having a key and stem protruding through a pivot and sliding surface with optical position and sideward detection and a tension element for resistance in a downward direction in accordance with the teachings of this invention.

Referring now to the drawings, in which the same reference numeral indicates the same element in the various figures, FIG. 1 shows a top surface 14 with pivot and sliding opening 13 allowing key stem 30 to slide in an up down direction as shown by up down arrow 32 and pivot or be sideward articulated as shown by upper lateral arrow 10. Key stem 30 having an optical opening 22 with optical opening top 34. When key stem 30 moves in a downward direction optical opening 22 with sides that straddle light beam 20 and allows light beam 20 to pass through until optical opening top 34 attenuates light beam 20 giving the position of stem 30. Emitter 28 and detector 16 can be mounted on printed wiring board 18 that can have circuitry to modulate the on and off conditions of each. Elastomeric pad 26 is disposed on printed wiring board 18. When elastomeric pad 26 or tension element is contacted by key stem 30, key cap 12 can be pivoted in a sideward direction. The resultant pivot direction of key stem 30 from upper lateral arrow 10 is shown by lower lateral arrow 24 and the sides of optical opening 22 modifies the resultant emitence of light beam 20 emitted from emitter 28 and incident on detector 16. The clearance between key stem 30 and pivot and sliding opening 13 can be matched to a users preference in as much as more clearance to get more angle of pivot to less clearance to get less angle of movement. At any time from when light beam 20 starts to be attenuated measurements can be made from that point until or during resistance has been felt by elastomeric pad 26 to equal velocity and acceleration from an operator pushing key cap 12. From the point that resistance is felt measurements can be made that can equal after pressure optically, or the amount of compression elastomeric pad 26 is being compressed optically. Tension elements like elastomeric pad 26 can be made from different durometer elastomers or other spring type components to give the feel conducive to an operator's preference. After pressure can be plus or minus so if the operator presses harder then softer the distance traveled can be equated to a computer function or when used in a musical instrument a louder or softer tone or note. It should be appreciated by those skilled in the art that the elements shown in FIG. 1 could be replicated to form a multi-key keyboard.

Elastomeric pad 26 is not a requirement to be used to detect the depth in position of key stem 30, in some systems it may just be a stop to stop the downward motion of key cap 12. If elastomeric pad 26 is not used depth can be measured through the attenuated range of optical beam 20, velocity from a point to a point can be measured, and acceleration can be measured because all measurements are in distance. This can be advantageous for an operator to use position in place of pressure, as in musical notes from a Trombone where notes are from the position of the slide, or for a handicap person that cannot apply a force sensing elements required force to get a pleasing output.

Figure 6:
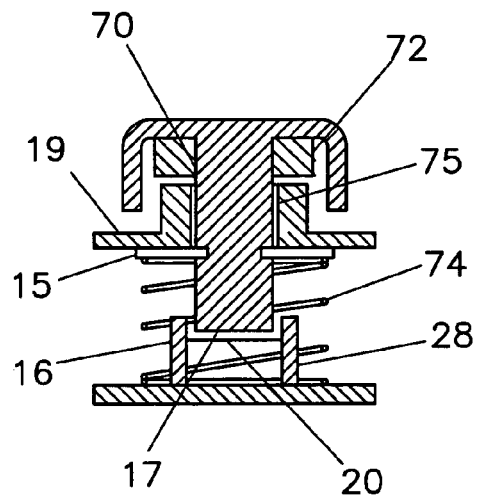
FIG. 6 is a section view through the a switch showing the key stem starting into optical detection in accordance with the teachings of this invention.

The tension element elastomeric pad 26 can be of the type used in FIG. 6 where that elastomeric pad 72 is placed in the key cap 12.

When key cap 12 is pivoted or oscillated in a sideward direction light beam 20 will be attenuated by the sides of optical opening 22 and can be measured as a distance to give acceleration and velocity, these measurements can equal a computer function or when playing music it can equal a vibrato effect. This is advantageous when oscillated to be able to have music actually sound as if it was coming from an actual musical instrument where sideward movement of a musicians fingers affect the mouth piece mouth relationship giving a varying intensity or vibrato effect. This is also advantageous when pivoted by a computer operator to input a function, like pivot the keyboard key to the left and get Ctrl+V to paste, and pivot the key to the right and get Ctrl+C to copy. When switch of FIG. 1 is used in a keyboard in plurality each key could output the same code or sequence of codes allowing ctrl+C or ctrl+V or any other code or sequence available with any typing finger while inputting data or playing music.

Figure 2:
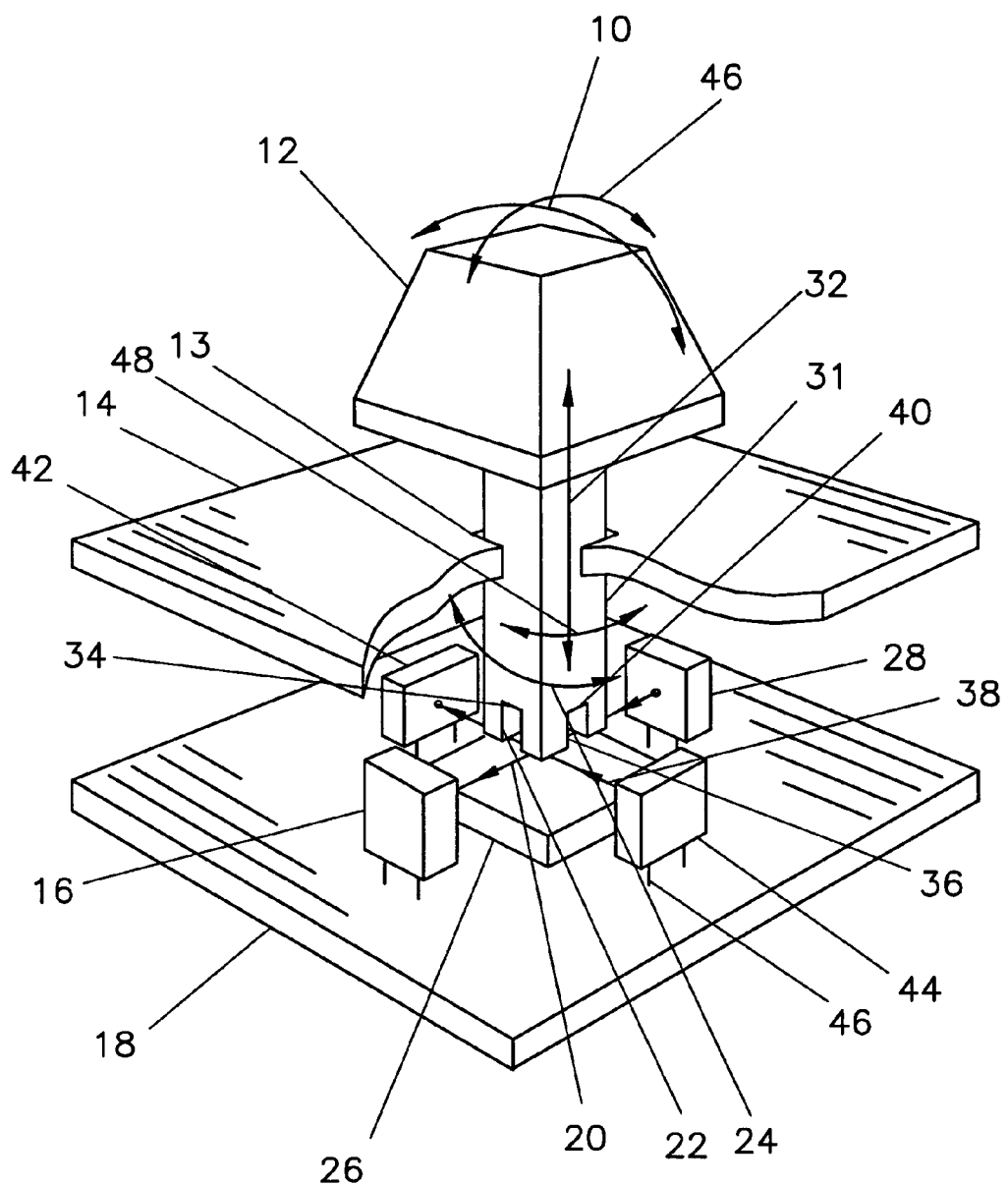
FIG. 2 is an isometric view of an optical switch having a key and stem protruding through a pivot and sliding surface with separate optical position and sideward detection and a tension element for resistance in a downward direction in accordance with the teachings of this invention.

FIG. 2 having the similar elements as FIG. 1 with the addition of a second emitter 44 and second detector 42 having a second optical beam 38 there between being attenuated in the up down direction by second optical opening top 40 in key stem 31 and attenuated in the front to back direction shown by upper front back arrow 46 giving a resultant movement in direction shown by lower front back arrow 48 by second optical opening 36. Having two emitter detector pairs bi-directional alignment allows selection of computer or musical functions in four directions or by triangulation in multiple directions, and when the output is directed to a mouse port can give cursor control.

Figure 3:
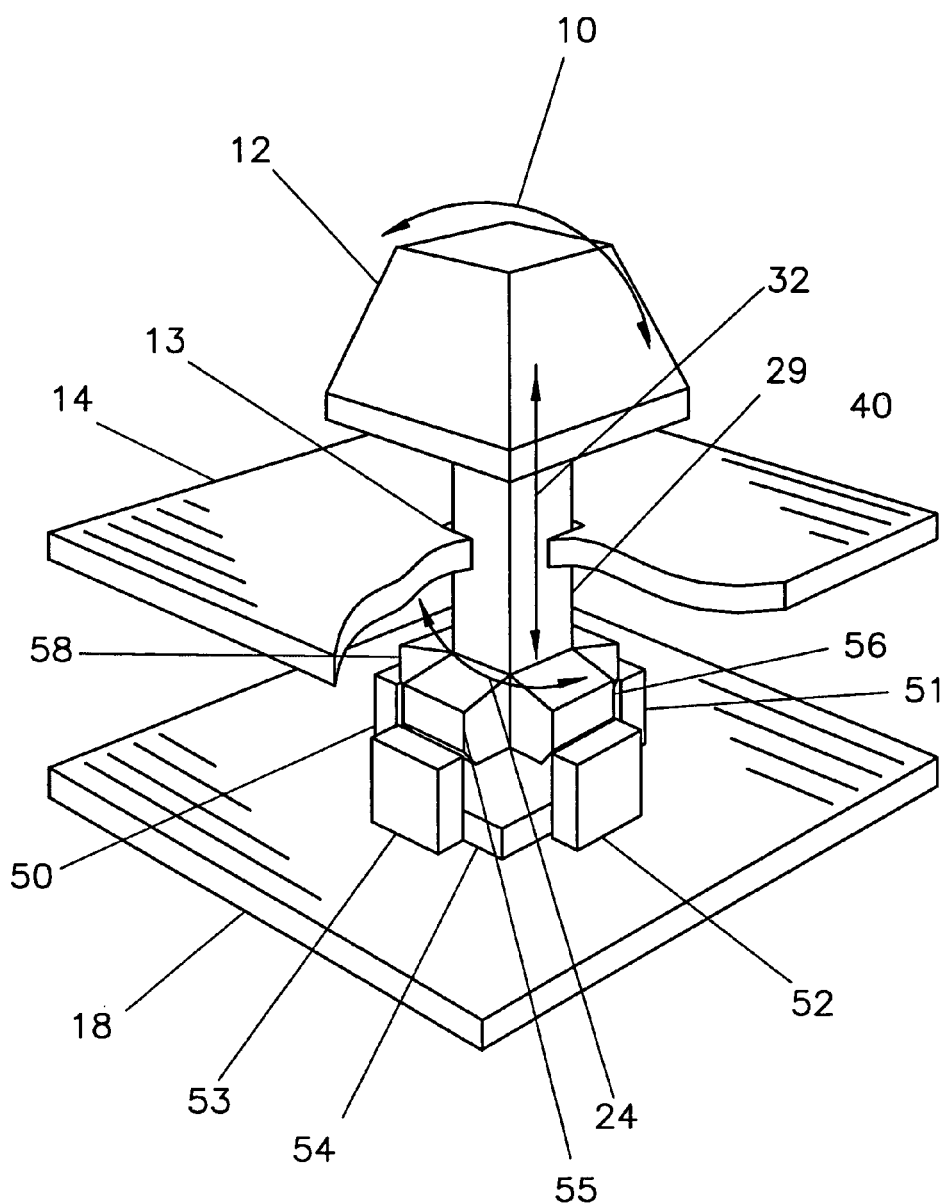
FIG. 3 is an isometric view of a switch having a key and stem protruding through a pivot and sliding surface with force sensitive elements for position, lateral and bilateral detection in accordance with the teachings of this invention.

FIG. 3 shows a switch in systems that do not require the rugged optical elements, shown with lower force sensing element 54 for depth, acceleration and velocity measurements flanked by left side pressure sensing element 50 and right side pressure sensing element 52 to be pressured by left force member 58 and right force member 56 when key stem 29 is moved or oscillated in the direction of lower lateral arrow 24. Bilateral pressure sensing element 53 to be pressured by side force member 55 can be perpendicular to left side pressure sensitive element 50 and right side pressure sensitive element 52 and opposed by a second bilateral pressure sensing element 51. When the application necessitates quad lateral detection for input data to a host computer or the like this arrangement of four pressure sensitive elements is advantageous. But any one of the four can be used when singular lateral detection is only needed. It should be appreciated that those skilled in the art that there are different force sensing elements to name two are resistive and capacitive either or others could be used, and in conjunction with position sensing elements like hall effect sensors, magnet sensors and RF based sensors.

Figure 4:
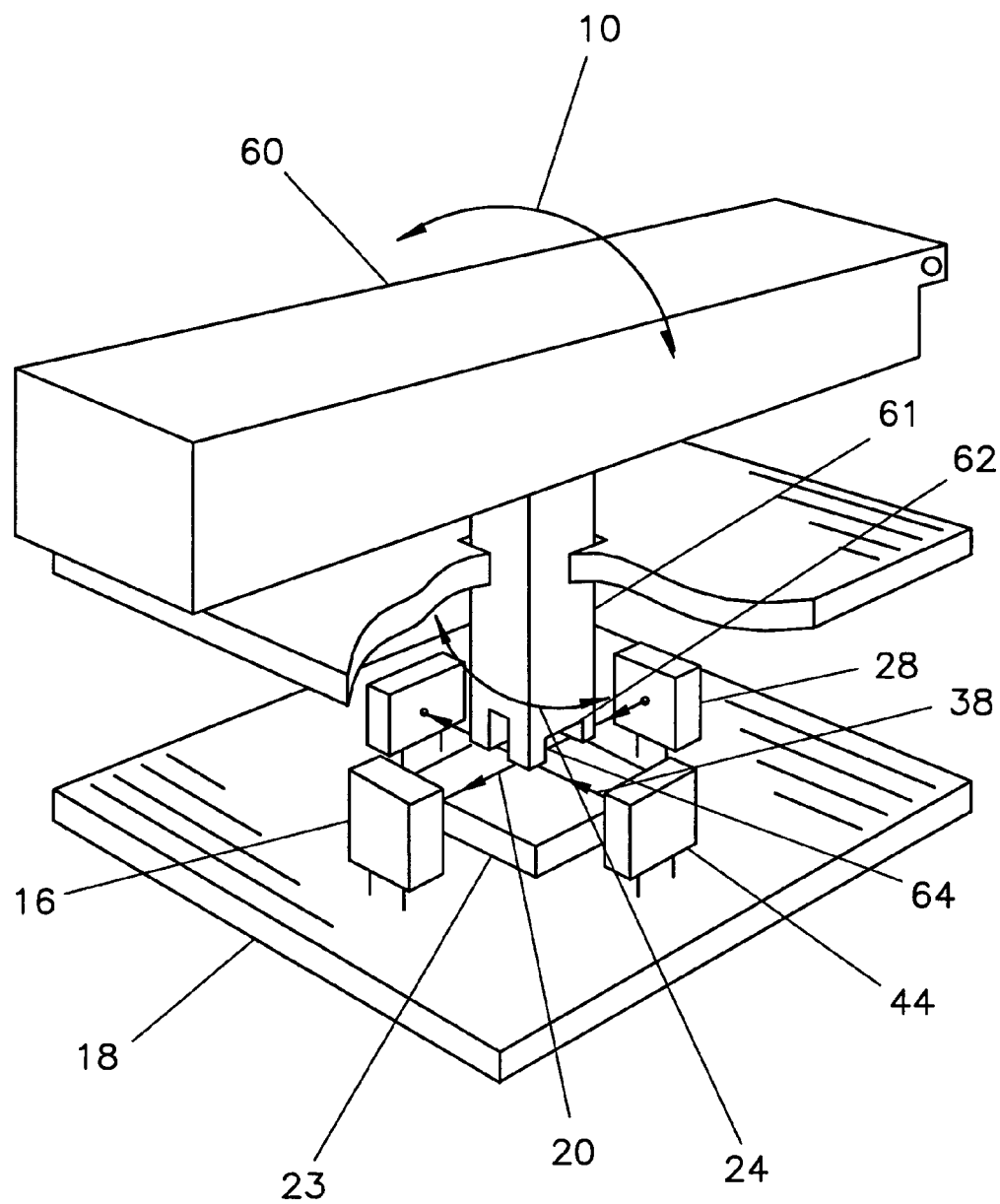
FIG. 4 is an isometric view of an optical switch having a musical key and stem protruding through a pivot and sliding surface with separate optical position and sideward detection and a tension element for resistance in a downward direction in accordance with the teachings of this invention.

FIG. 4 shows a musical key 60 being used to position stem 61. Optical slot 64 is made wide as not to attenuate second optical beam 38 enabling in the up down direction to be attenuated by optical slot top 62 in key stem 61, and can have pressure resistive pad 23 if resistance to downward key motion is desired. If another output function is needed pressure resistive element 23 can be pressure sensitive so when pressed sending other codes depending on the application. This is advantageous so there is only one optical beam per function facilitating less computation, like a first function could be up down and a second function be side ward or lateral for vibrato and other inputs.

Figure 5:
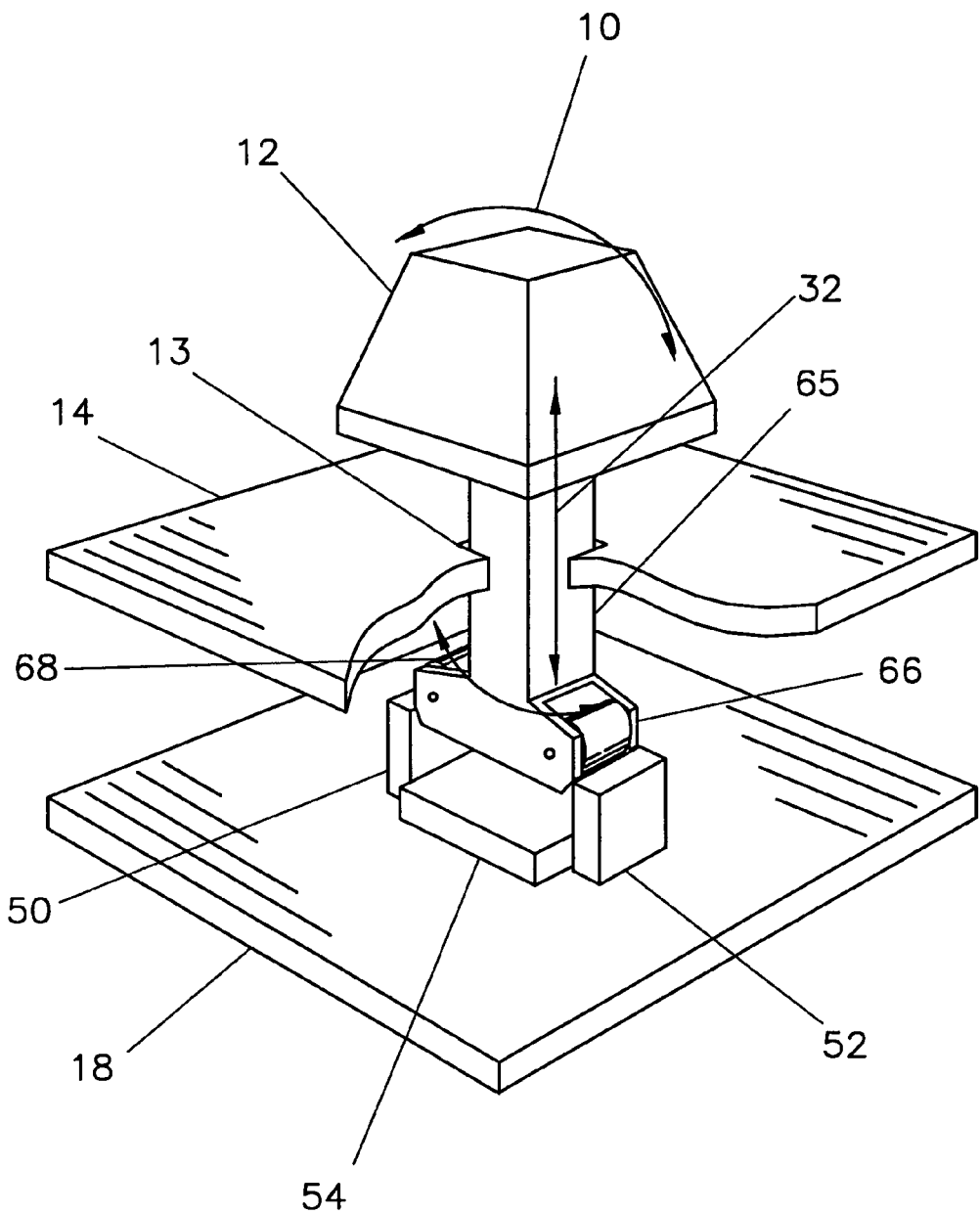
FIG. 5 is an isometric view of a switch having a key and stem protruding through a pivot and sliding surface with force sensitive elements for position and sideward detection with roller contact in accordance with the teachings of this invention.

FIG. 5 shows a switch in systems that is more rugged than the switch in FIG. 3 by having the addition of low resistant rollers for side ward pressure. Lower force sensing element 54 for being used for depth, acceleration and velocity measurements flanked by left side force sensing element 50 and right side force sensing element 52 to be pressured by left force roller 68 and right force roller 66 when stem 30 is moved or oscillated in the direction of lower lateral arrow 24.

FIG. 6 is a section view of a switch that has the elastomeric material under the key cap. Key stem 70 being pivotibly and slideably received in pivot and sliding surface 19 is shown before optical beam 20 is attenuated by lower surface 17 of key stem 70. Elastomer pad 72 is shown prior to contacting pivot and sliding opening 75. Key stem spring 74 holds key stem in an up position being restrained in the up direction by key stem retainer 15 awaiting depression from an operator.

Figure 7:
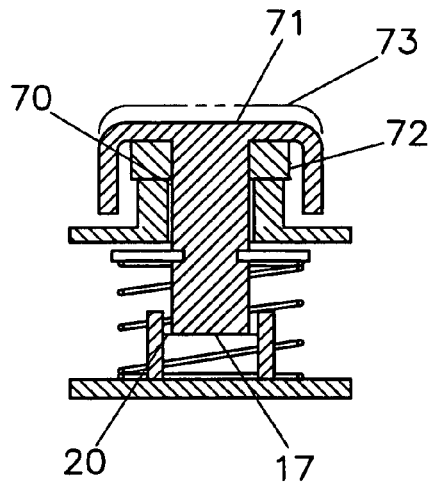
FIG. 7 is a section view through a switch showing the key stem at a mid point through optical detection starting to contact the tension element resistance in accordance with the teachings of this invention.

FIG. 7 is a section view of a switch with lower surface 17 in a mid position attenuating optical beam 20, and in first contact with elastomer pad 72. Phantom line 73 shows the starting or up position of key cap 71.

Figure 8:
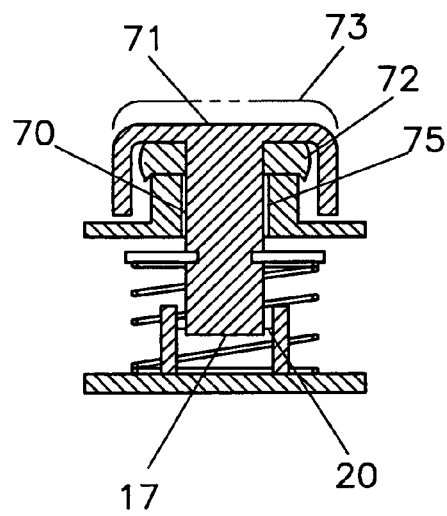
FIG. 8 is a section view through a switch showing the key stem through optical detection and in full contact with the tension element resistance in accordance with the teachings of this invention.

FIG. 8 is a section view of a switch with key cap 71 reaching the extent of downward travel of key stem 70 compressing elastomer pad 72 and lower surface 17 further attenuating optical beam 20.

Figure 9:
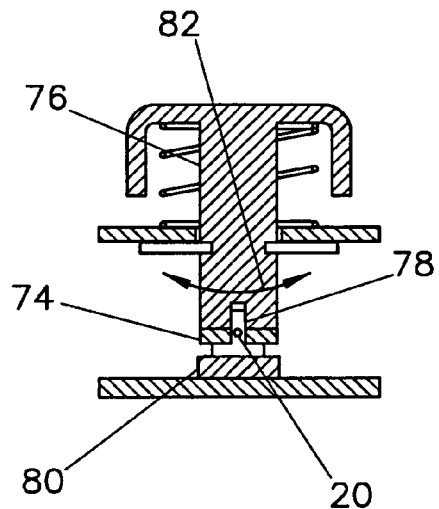
FIG. 9 is a section view through a switch with position force sensing element and optical sideward detection in accordance with the teachings of this invention.

FIG. 9 is a section view of a switch that uses optical lateral or vibrato detection and a force sensing element for depth, acceleration and velocity. Key stem 76 is shown in an up position with optical beam 20 being straddled by optical opening 78. Whereas when lateral movement is made by key stem 76 shown by lateral arrow 82 optical beam 20 is attenuated by the sides of optical opening 78 to be calculated by electronic circuit as shown in FIG. 26 and flow chart in FIG. 25 to give distance, velocity and cycle times. Pressure foot 74 will contact force sensing element 80 when key stem 76 is in a down position. Pressure foot 74 can be an elastomer of other spring type material. This is advantageous to give better sideward or lateral movement control in applications that want lower pressure for vibrato when in constant contact with force sensitive element 80.

It is known in the art that FSR's have a force verses resistance relationship such as 0.35 oz. with 10 ohms resistance, 3.57 oz. with 10K ohms resistance or otherwise a direct relationship, but the distance of travel to obtain this resistance change is virtually zero. So it can be advantageous to use an elastomeric pad to contact the pressure sensitive element and although the change in resistance is not as great, the durometer of the elastomeric pad allows for more distance to be traveled by the key stem giving a better feel and protecting the FSR from damage resulting from severe force.

Figure 10:
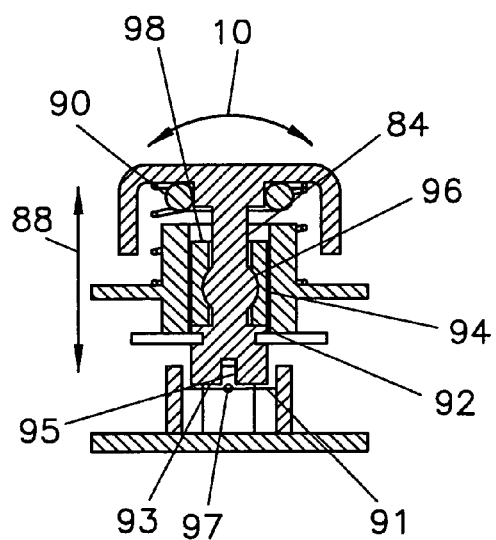
FIG. 10 is a section through an optical switch having a key and stem protruding through a pivot and sliding surface with separate optical position and sideward detection and an elastomeric resistance with a low resistance sideward articulation ball mechanism in accordance with the teachings of this invention.

FIG. 10 is a section view of a switch in which key stem 84 has a pivot ball 96 to allow full sideward articulation in 360 degrees. Ball slide 98 slides up and down in pivot and sliding opening 94 as shown by up and down arrow 88. Key stem lower surface 93 attenuates optical beam 91 in the up down direction. The sides of optical opening 95 attenuates crossing optical beam 97 in the direction of upper lateral arrow 10. Alignment surface 92 is nested in pivot and sliding opening 94 keeping key stem 84 in a neutral position until key stem 84 is pressed in a down direction allow articulation of key stem 84 about pivot ball 96. Elastomer pad O-ring 90 is shown to limit downward travel and to give resistance to the movement of key stem 84.

Figure 11:
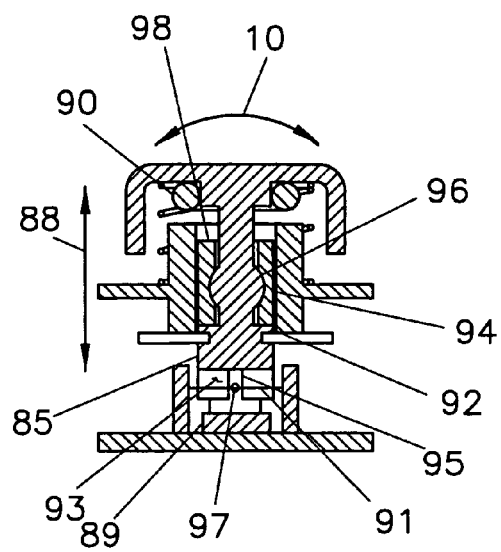
FIG. 11 is a section through an optical switch having a key and stem protruding through a pivot and sliding surface with bi-directional sideward or lateral detection and an elastomeric resistance with a low resistance sideward articulation ball mechanism with pressure sensing downward detection in accordance with the teachings of this invention.

FIG. 11 is a section view of a switch showing similar elements of FIG. 10 but key stem 85 is longer and remains in optical beam 91 and crossing optical beam 97. Optical opening 95 and crossing optical opening 93 straddling optical beam 91 and crossing optical beam 97 unattenuating each until lateral articulation is started. By having two crossing optical beams being articulated triangulation can be made to direct a cursor or other computer function with a small amount of force. Alignment surface 92 as explained in FIG. 10 is optional depending on designer preference in as much as if alignment surface 92 is used then an operator moving their fingers over the key surface will not allow any attenuation of position, attenuation will only occur after depressing key stem 85 thus releasing movement to allow attenuation. Then if alignment surface 92 is not there then attenuation of position can be at anytime the key stem 85 is moved. Force sensing element 89 detects the up down key position with varying pressure from key stem 85.

Figure 12:
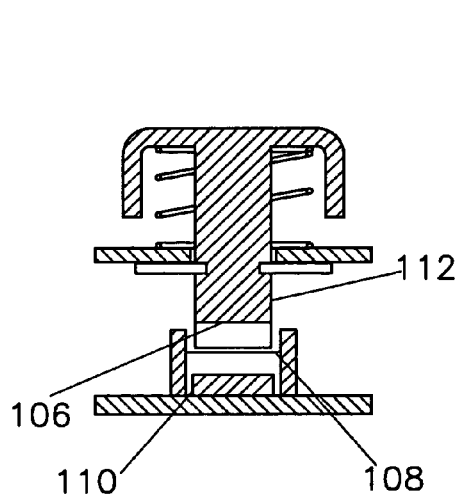
FIG. 12 is a cross section view of a optical switch having a key and stem protruding through a pivot and sliding surface with optical position and sideward detection and an elastomeric resistance in a downward direction beneath the stem in accordance with the teachings of this invention.

FIG. 12 is a section view of a switch showing key stem 112 in an up position prior to attenuating optical beam 108 with optical slot top 106.

Figure 13:
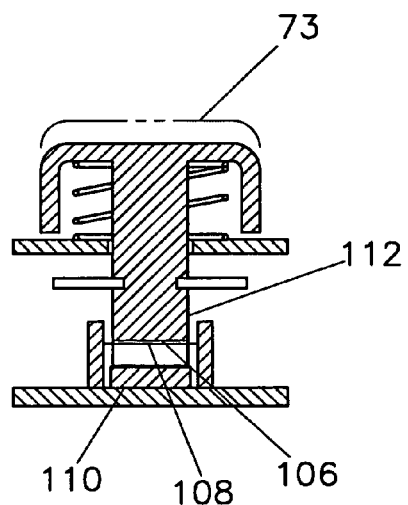
FIG. 13 is a section view of a optical switch in a depressed position having a key and stem protruding through a pivot and sliding surface with optical position and sideward detection and a tension element for resistance in a downward direction beneath the stem in accordance with the teachings of this invention.
Figure 21:
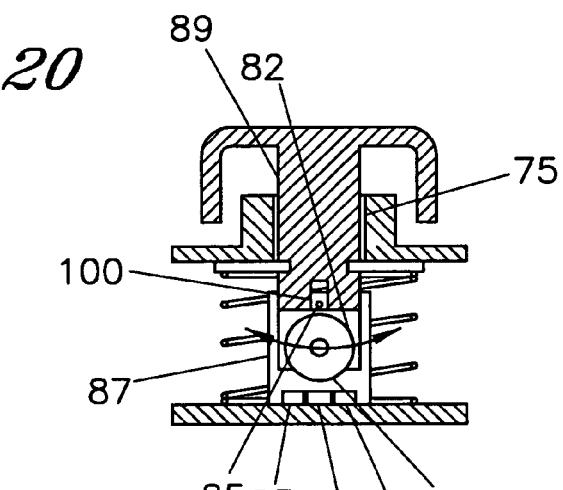
FIG. 21 is a section view of a switch with optical and pressure sensing elements for downward detection and low resistance roller for lateral detection in accordance with the teachings of this invention.

FIG. 13 is a section view of a switch of FIG. 12 showing key stem 112 in a downward position from phantom line 73 attenuating optical beam 108 with optical slot top 106 and in first contact with elastomeric pad 110. It should be appreciated that key stem 112 could also have roller contact 79 like is shown in FIG. 21 to reduce the lateral force being applied to key stem 112 while in contact with elastomeric pad 110.

Figure 14:
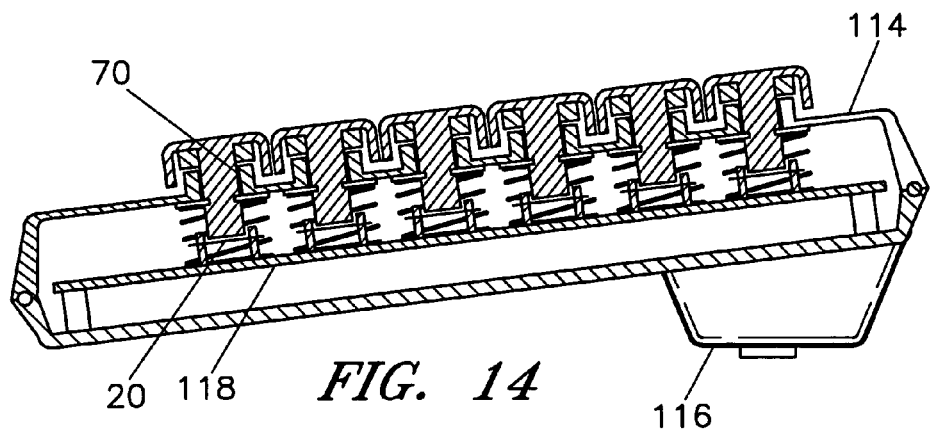
FIG. 14 is a cross section through a computer or musical keyboard showing multiple optical switches in accordance with the teachings of this invention.

FIG. 14 is a section view of a keyboard showing the switch of FIG. 6 in plurality. With key stem 70, optical beam 20, printed wiring board 118 being housed in upper housing 114 and lower housing 116. Having a plurality of switches allows the keyboard to be used for various functions as in input computer codes to a host, position a cursor, input cursor left, right and scroll codes to a host, input Musical Instrument Digital Interface (MIDI) commands for playing music, or input computer codes for playing music on a PC.

Figure 15:
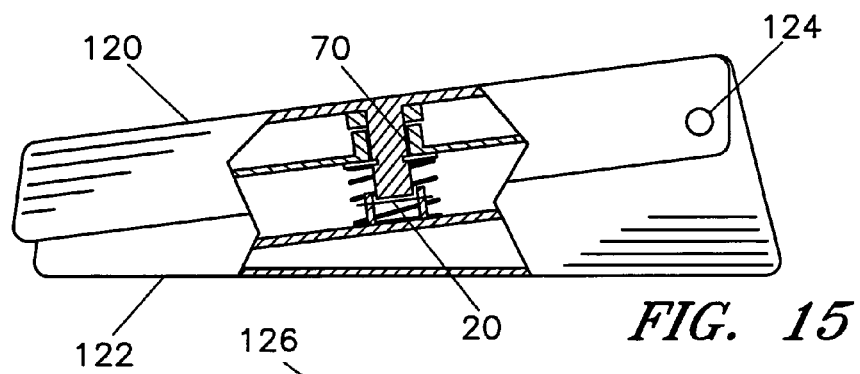
FIG. 15 is a partial section view through an optical foot switch in accordance with the teachings of this invention.

FIG. 15 is a partial section view of a foot switch or foot pedal having key stem 70 and optical beam 20 housed within upper moveable housing 120 and lower housing 122 with pivot 124 there between to allow movement of key stem 70 through optical beam 20 wherein movement can be varied by depressing upper housing 120 to vary the output resultant from attenuating optical beam 20.

Figure 16:
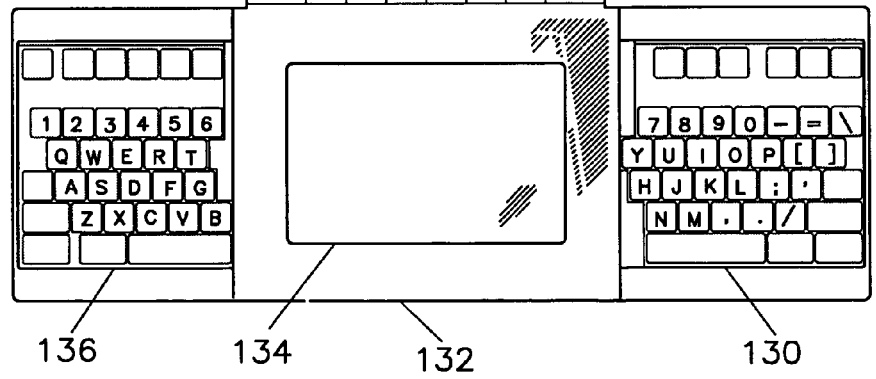
FIG. 16 is a plan view of a dual screen notebook computer with a velocity, acceleration, and lateral detection keys used in a split keyboard in accordance with the teachings of this invention.

FIG. 16 shows a notebook computer with rear display 128 mounted in rear housing 126 attached to lower housing 132 laterally adjoined by left side articulated key keyboard 136 and right side articulated key keyboard 130 which can be fitted with any of the key switches heretofore mentioned. A separate mouse positioning apparatus is not needed because any one or more of the keys can have mouse like articulation heretofore mentioned in delineation of FIG. 2 and FIG. 11. Lower display 134 is disposed on lower housing 132. The arrangement of keys is split at a point to optimize typing or use of the keyboard. This is also an ergonomically advantageous of keys and display to keep your wrist straight, and if you are typing or playing music your reference material, sheet music, or the like can be placed on lower display 134 to keep your neck straight and avoid looking to the side. Left side articulated key keyboard 136 and right side articulated key keyboard 130 can in a fixed position or if the notebook computer is going to be used for travel then they can be made to retract over lower display 134. In as much as FIG. 16 is presented as a notebook computer it should be appreciated that those skilled in the art could think of the notebook computer with very limited function as in just for playing music, or just a split keyboard for use with a computer or musical instrument with a surface for reference material like sheet music or web notes.

Figure 17:
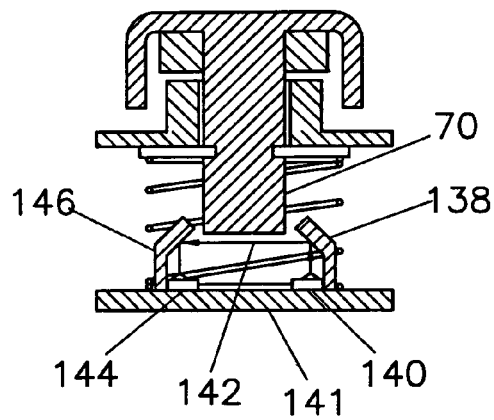
FIG. 17 is a section view of an optical switch with mirrors to direct the optical beam in accordance with the teachings of this invention.

FIG. 17 shows a different arrangement for directing optical beam 142 being emitted from emitter 140 and being detected by detector 144. Using emitter mirror 138 and detector mirror 146 both emitter 140 and detector 144 can be surface mounted on printed wiring board 141 to facilitate high production assembly of the switch and or a keyboard.

Figure 18:
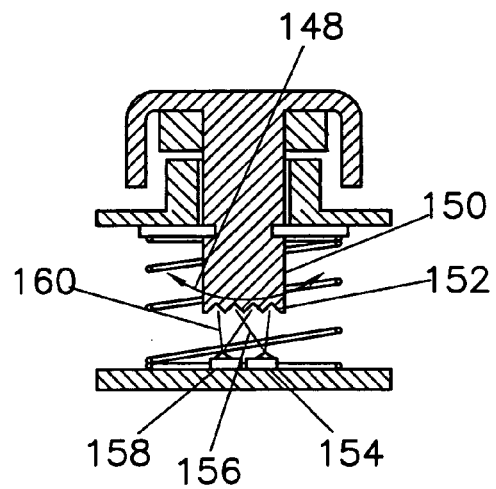
FIG. 18 is a section view of an optical switch with a serrated lower key stem to detect position and change in lateral position of the key stem in accordance with the teachings of this invention.

FIG. 18 shows emitter 154 emitting a divergent optical beam 156 and being reflected by serrated detection surface 152 on the lower surface of key stem 150 and back through detector beam 160 to detector 158. When key 150 is moved in the approximate arc shown by lower arc 148 this movement attenuates the detector beam 160 and to show sideward or lateral movement of key stem 150. Down ward detection can be made by the ever decreasing amount of optical beam incident on detector 158 as key stem gets closure to detector 158.

Figure 19:
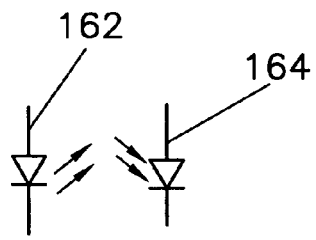
FIG. 19 is an electrical schematic of an optical switch in accordance with the teachings of this invention.

FIG. 19 shows emitter 162 and detector 164 are the only electrical components needed in a singular optical key switch.

Figure 20:
FIG. 20 is an electrical schematic of a pressure sensitive switch in accordance with the teachings of this invention.

FIG. 20 shows pressure sensitive element 166 is the only electrical component needed in a singular pressure sensitive key switch. The pressure sensing element can be but not limited to pressure sensing resistor or a pressuring sensing capacitor type component, and as shown in FIG. 21 there can be multiple pressure sensors to sense lateral positions. And although only three are shown in FIG. 21 it is to be understood by those experienced in the art that more or less could be used to increase or decrease sensitivity in the lateral direction as shown by lateral lower arrow 82.

FIG. 21 is a section view of a switch with roller contact 79 to apply pressure to pressure sensitive element 81 and to allow lateral movement in the direction of lateral lower arrow 82 by key stem 89 being pivotably and slideably received in pivot and sliding surface 75 allowing the sides of optical opening 100 to attenuate optical beam 85 being emitted from emitter 87. As an option pressure sensitive element 81 can be flanked by left pressure sensitive element 83 and right pressure sensitive element 77 allowing when key stem 89 is laterally articulated roller contact 79 can apply pressure to left pressure sensitive element 83 or right pressure sensitive element 77 to output a vibrato type of output or a code or codes to a host. This is advantageous to allow lower pressure on a key or persons finger when laterally articulating. The width of the pressure sensing elements can be varied to better optimize either vibrato or computer key output movements. Pressure sensitive element 83 could also be an elastomeric pad like elastomeric pad 110 as in FIG. 13 when the downward direction is to be sensed by optical beam 85 eliminating the need for pressure sensitive elements. Optical opening 100 is a hole through key stem 89 with optical beam 85 there through can alternately be enabled after contact is made by roller contact 79 on pressure sensitive 81 to lesson any ambiguous attenuation of optical beam 85.

The downward direction can also be sensed by pressure sensitive element 81 and in the lateral direction by lateral signature detection whereas the rolling effect is measured and results to be different than a singular downward pressure.

FIG. 22 is a side view of the keyboard showed in FIG. 22 showing key cap 12, upper housing 170 and lower housing 168.

FIG. 23 is a plan view of a keyboard showing key cap 12 and upper housing 170 can have a plurality of keys for computer input to either playing music or normal operation of a PC. The pattern number of keys can be varied to match a particular application.

Figure 24:
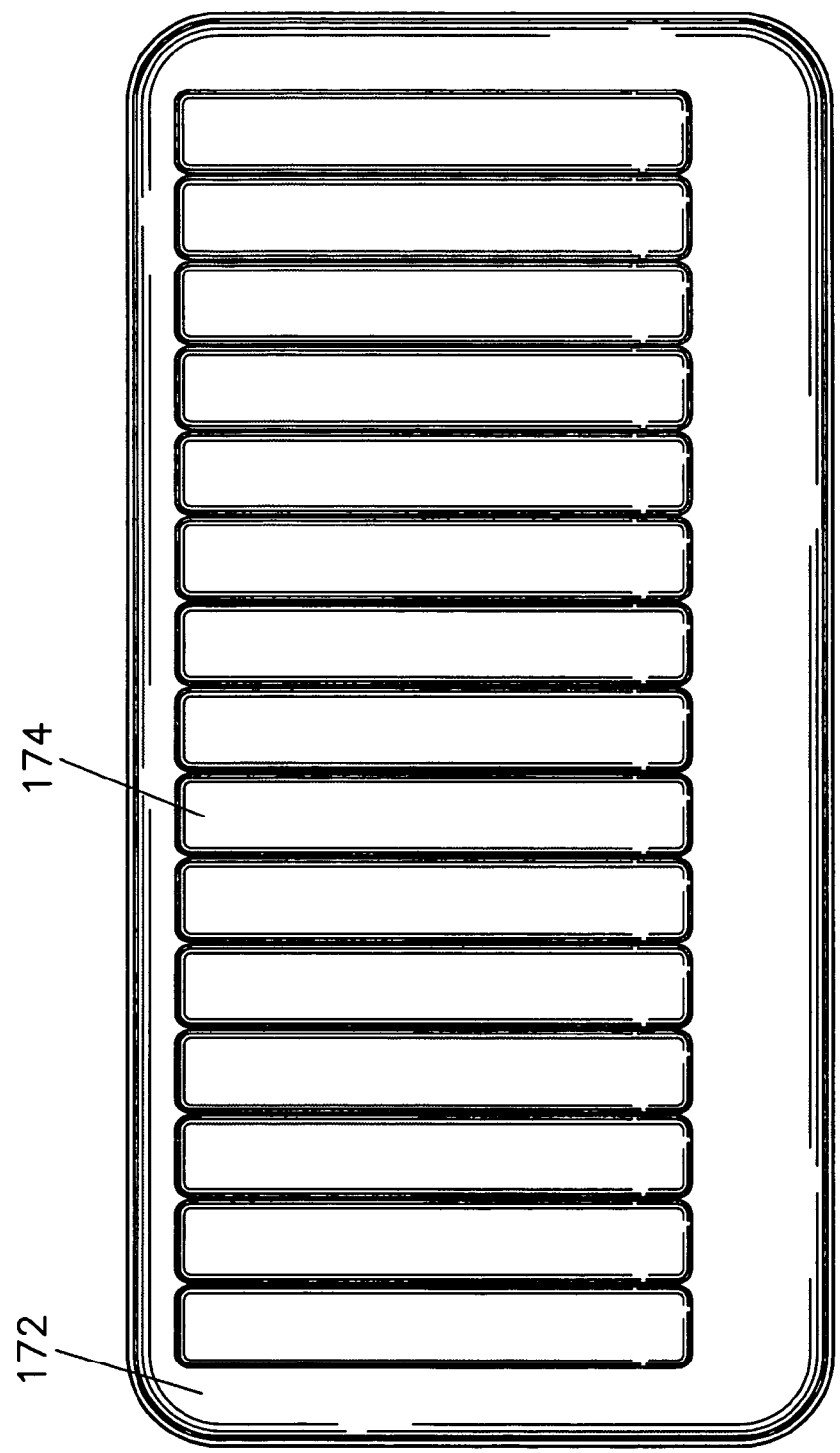
FIG. 24 is a plan view of a musical keyboard with optical key detection in accordance with the teachings of this invention.

FIG. 24 is a plan view of a keyboard with a long key 174 and upper housing 172 with a musical pattern of keys. The number of keys can be varied to match a particular set of notes or have a piano set of 88.

Figure 25:
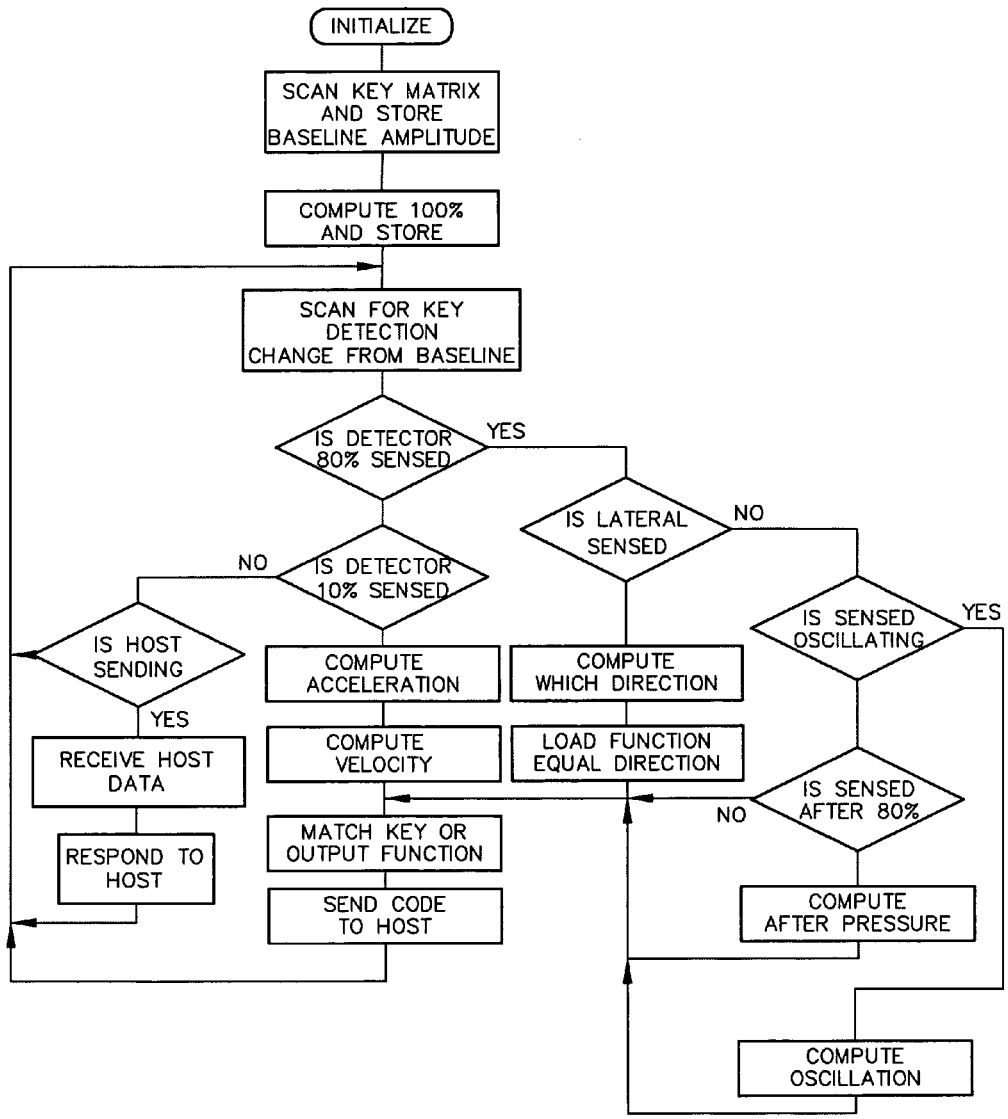
FIG. 25 is a flow diagram illustrating the keyboard functions with key stem and sideward articulation detection in accordance with the teachings of this invention.
Figure 26:
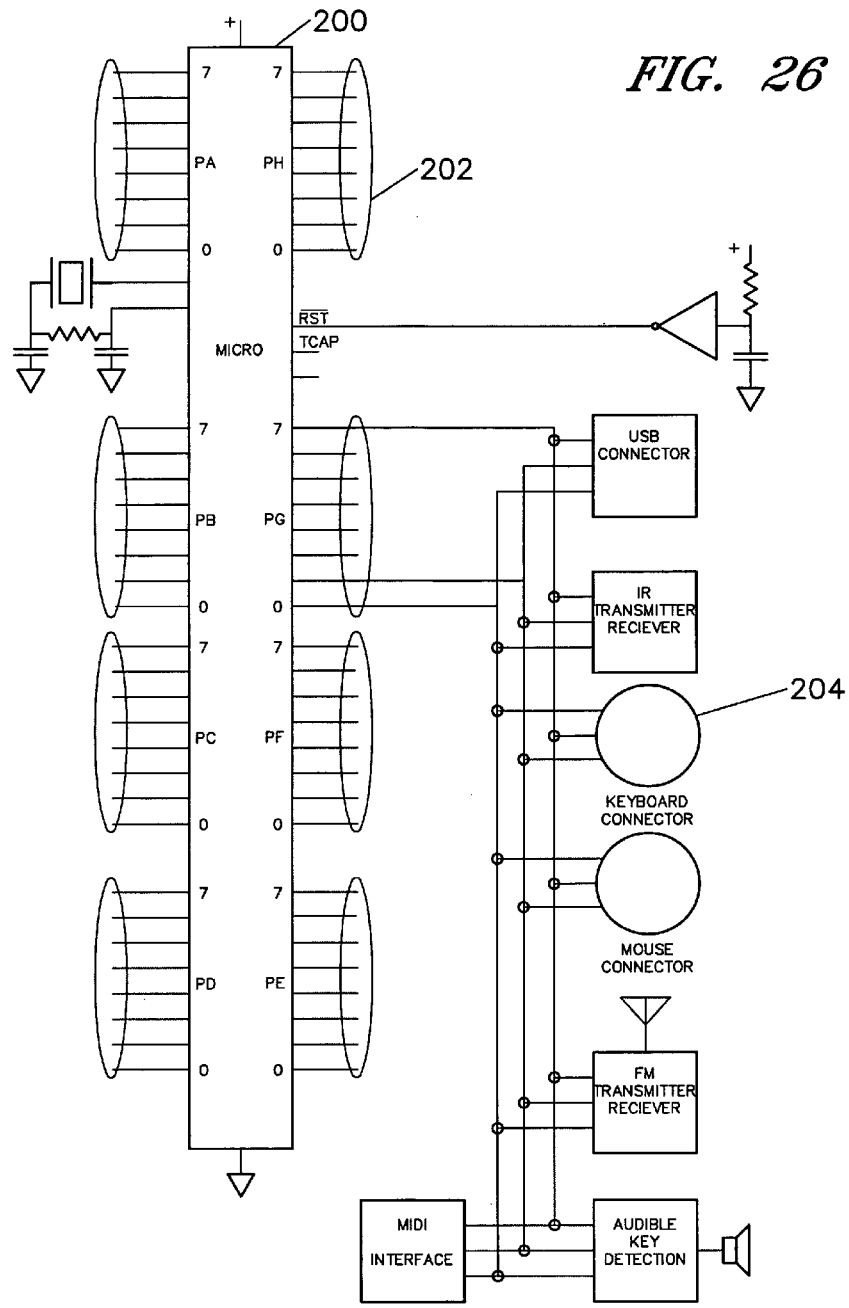
FIG. 26 is a schematic illustrating the microprocessor section of a keyboard with key stem position and sideward articulation detection in accordance with the teachings of this invention.

FIG. 25 is a firmware flow chart showing key detection and detection of velocity, acceleration and sideward or lateral key movement of a keyboard with a plurality of key switches. With a singular key switch there is no firmware needed with the switch it would be provided by the host device, this flow chart is to be used when a plurality of key switches are used on a keyboard. The flow chart is shown being generic and can relate to optical or proximity sensors or pressure sensitive components.

In INITALIZE ports are set to be in either input or output conditions depending on use, ram is tested, and start up sequence with the host is preformed. At SCAN KEY MATRIX a scan is made to store a base line set of vales showing starting point where no keys are pressed. A 100% number is assigned to each detector and is based on the baseline value so all detectors can be computed and said to be equal, in applications where more precise calculations are needed for key articulation then a linearization would need to be done on each sensor and that value put in a table to be called when a percent of amplitude is needed. A scan is made to check if a key has been detected at SCAN FOR KEY. A value of 80%, this value can be changed to match a particular switch or keyboard application need, is used at IS DETECTOR 80% SENSED to see if a key has reached a down or interim position signaling the end of detection or just before after pressure will be tested, if no then a test is made for detector being sensed less than 10% or not sensed at IS DETECTOR 10% SENSED, no then a test is made to see if the host is sending at IS HOST SENDING, if no then a return to SCAN FOR KEY.

If at IS HOST SENDING is yes then RECEIVE HOST DATA, RESPOND TO HOST if necessary and return to SCAN FOR KEY. If at IS DETECTOR 10% SENSED the sensed signal is above 10% then COMPUTE ACCELERATION, by reading and storing the first amplitude, compare with next amplitude and count the time verses amplitude using a percent to equal an acceleration. Then COMPUTE VELOCITY in the same way using a percent to equal Velocity. The MATCH KEY OR OUTPUT FUNCTION to a key or output function and SEND CODE TO HOST in a data string with key code being first and the second being a data byte to equal acceleration and velocity. Those skilled in the art can appreciate that three bytes could be sent, one for each function, key code, acceleration and velocity, or in a computer keyboard where only a key code is needed then only be one byte. These bytes can be either PS2 codes, ASCII codes or a custom code derived for speed of transfer over a standard PS2 link or other data link systems like USB, serial or parallel, or to the 31250 baud MIDI specification.

If yes at IS DETECTOR 80% SENSED a test is made at IS LATERAL SENSED to see if a sideward or lateral articulation is being made. This is done by testing if the side sensors have a change is sensed value. This test could also be made prior to IS DETECTOR 80% SENSED and is advantageous in applications where lateral movement is made for other computer or musical products like a mouse pointing device or for use by a handicap person that cannot produce the force necessary to attain 80% pressure, or in the case of the musical instrument where lateral movement is vibrato and the vibrato is wanted above 80%, or to enter codes or sequences of code like ctrl+C for copy and ctrl+V for paste, any of which can be programmed into the keyboard or computer to be recalled by the keyboard lateral direction. If at IS LATERAL SENSED is yes then COMPUTE WHICH DIRECTION by testing which side or triangulate to see the angled direction, then LOAD FUNCTION EQUAL DIRECTION and go to MATCH KEY OR OUTPUT FUNCTION. If at IS LATERAL SENSED is no then test IS SENSED OCSILLATING to see if the signal is changing, then test IS SENSED AFTER 80% is no then go to MATCH KEY OR OUTPUT FUNCTION. If IS SENSED AFTER 80% is yes then compute after pressure by reading and storing the first amplitude, compare with next amplitude and count the time verses amplitude using a percent to equal after pressure. After pressure is more commonly used in musical instruments when a key is held down, then the musician can press harder and get a louder note, or now with the ever changing need for more function from a computer or keyboard the after pressure can be equated and assigned any function code like a mouse, key, or a series of codes as in ctrl+V for paste. Then go to MATCH KEY OR OUTPUT FUNCTION.

If at IS SENSED OSCILLATING is yes then by computing a oscillation of the amplitude rising and falling at a rate being done at COMPUTE OSCILLATION and got to MATCH KEY OR OUTPUT FUNCTION where a data code value is assigned for the oscillation signature whether it be vibrato or other assigned functions.

FIG. 26 is the micro processor schematic for a keyboard. Keyboard micro processor 200 has various ports under control of the firmware, one such port 202 is shown labeled PH referring to Port H, these ports control the input/output of the keyboard, turning on and off the emitters and detectors, and detecting varying voltage amplitudes from the detectors. One such input/output is shown at keyboard connector 204, others shown are for MIDI, FM, IR, MOUSE and USB.

Figure 27:
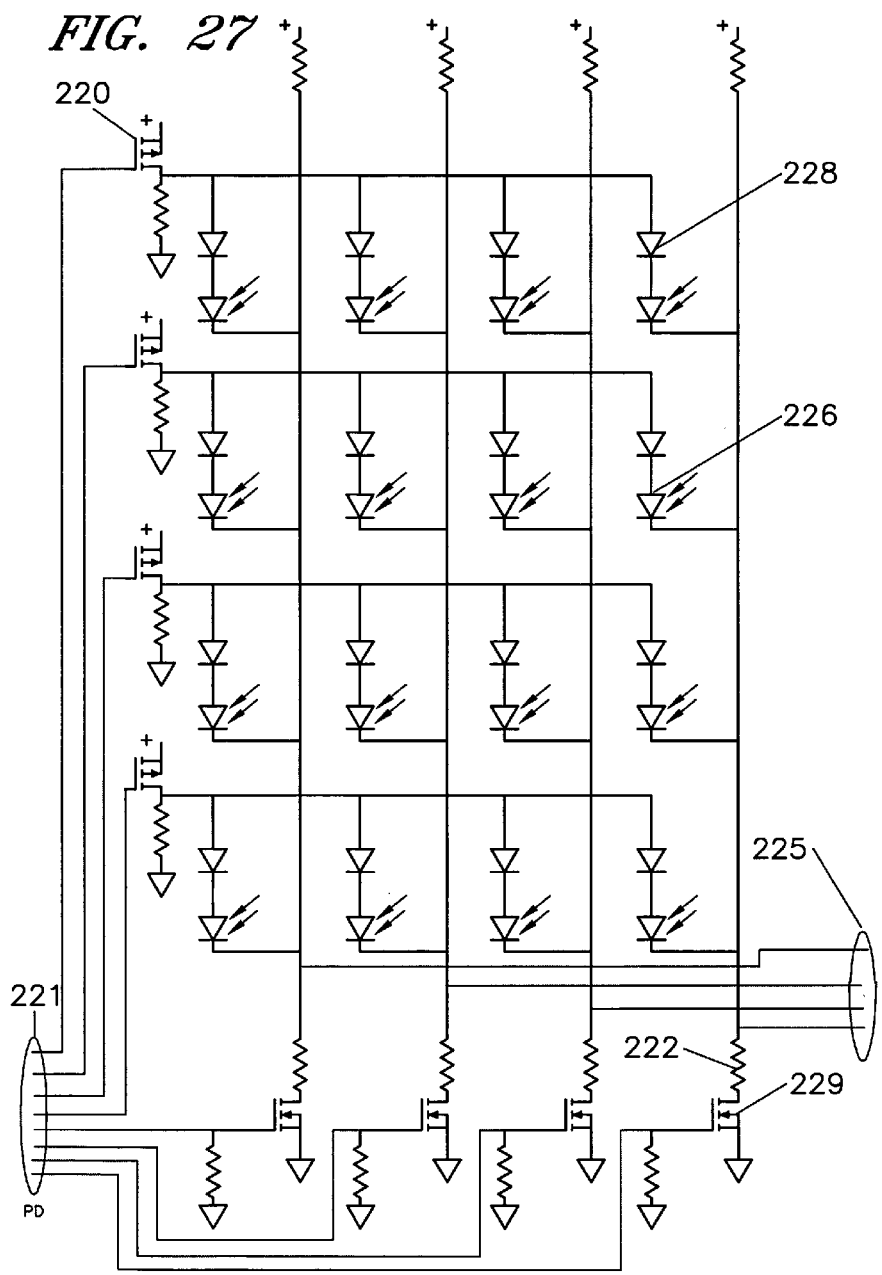
FIG. 27 is a schematic illustrating the elements of a typical optical detector matrix of a keyboard in accordance with the teachings of this invention.
Figure 28:
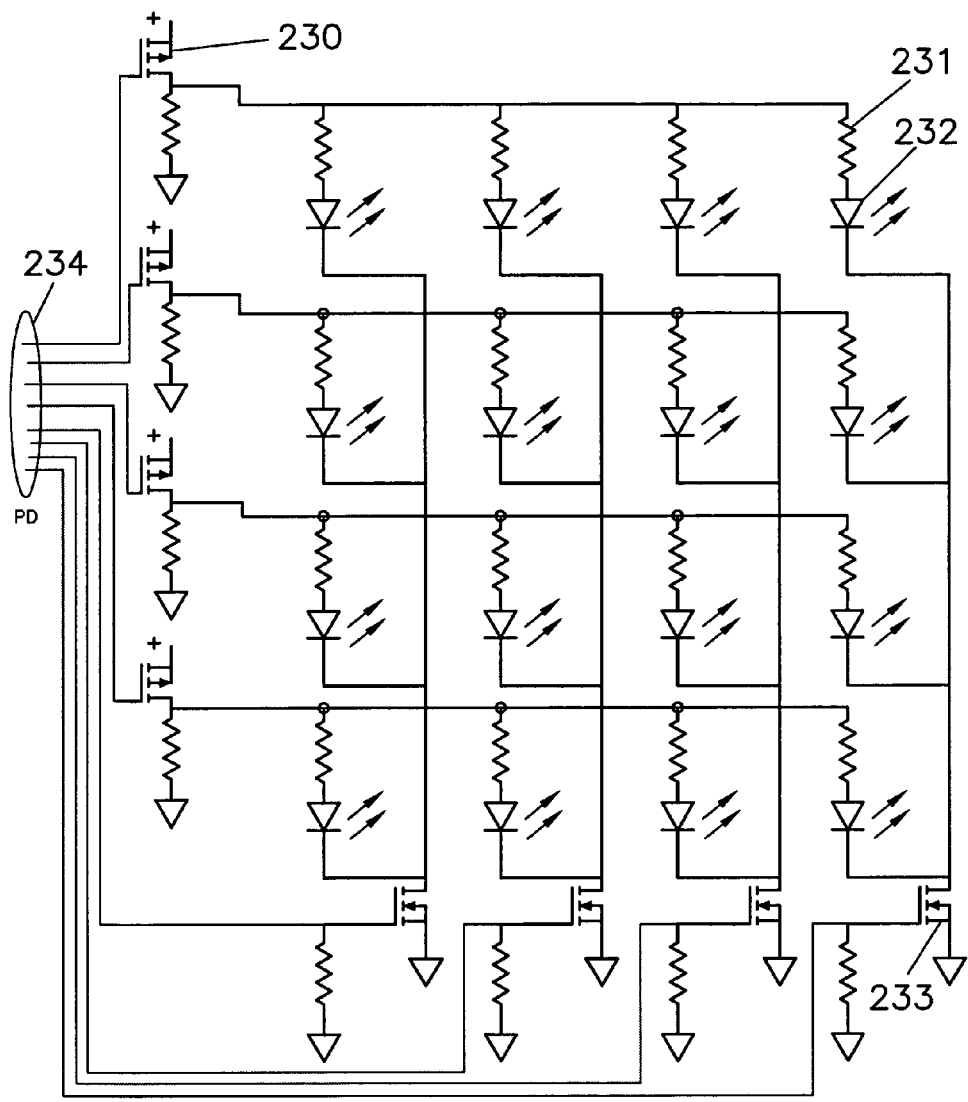
FIG. 28 is a schematic illustrating the elements of a typical optical emitter matrix of a keyboard in accordance with the teachings of this invention.

The quantities of keys vary with different keyboards for different applications as shown in FIG. 16, FIG. 22 and in FIG. 24. FIG. 27 shows a typical detector matrix, and FIG. 28 shows the detectors matching typical emitter matrix, and depending on the number of detectors and emitters needed in a given keyboard these typical matrixes can be decreased or increased to match the application. In operation PFET 220 is turned on to give a positive bias to signal resistor 222 by output port 221, at the same time NFET 229 is turned on to give a negative bias to the cathode of detector 226 by port 221. A voltage amplitude is then seen over A/D resister 222 and at A/D input port 225. This voltage amplitude will then vary depending on the amount of light that is emitted to detector 226. The amount of light that can be emitted to the detector is governed by the position of the key stem, one such is key stem 30 of FIG. 1. If the key stem or interrupter is not depressed then the majority of light from an emitter is received by the detector, then depending on the amount of depression by the user on the key stem varying amounts of light will be seen as voltage amplitude changes at port 225. Isolation diode 228 isolates detector 226 to maintain proper voltage bias.

In FIG. 28 PFET 230 is turned on by port 234 to give a positive bias to emitter 232 through current limiting resistor 231. NFET 233 is then turned on by port 234 the give a negative bias to emitter 232 thus illuminating emitter 232. Using a matrix like is shown in FIG. 27 has two distinct advantages, one being a power saving in overall current drain from the host because the detectors are alternatively turned on, and two, isolating detector emitter pairs to limit cross talk between different detector emitter pairs.

Figure 29:
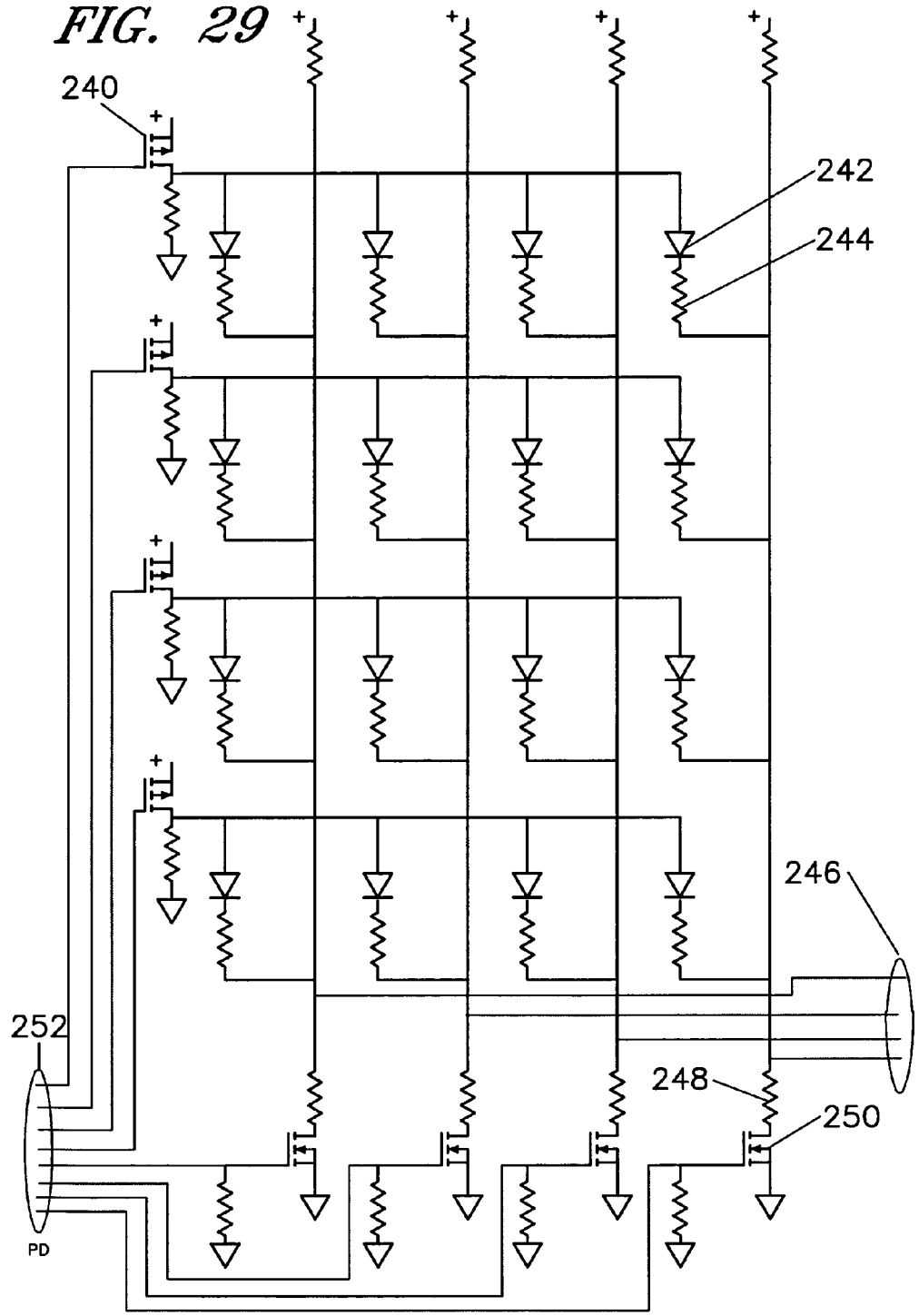
FIG. 29 is a schematic illustrating the elements of a typical pressure sensitive matrix of a keyboard in accordance with the teachings of this invention.

In FIG. 29 it shows a similar sensor matrix as in FIG. 26 with the exception the sensors are pressure sensitive and do not need an opposing emitter matrix. In operation PFET 240 is turned on to give a positive bias to signal resistor 248 by output port 252, at the same time NFET 250 is turned on to give a negative bias sensor 244 by port 252. A voltage amplitude is then seen over A/D resister 248 and at A/D input port 246. This voltage amplitude will then vary depending on the amount of pressure that is applied to the key stem to sensor 244. The amount of pressure that can be applied to the sensor is governed by the position of the key stem. If the key stem is not depressed then there is no pressure on sensor 244, then depending on the amount of depression by the user on the key stem varying amounts of pressure will be seen as voltage amplitude changes at port 246. Isolation diode 242 isolates sensor 244 to maintain proper voltage bias.

While the invention has been described in terms of a single preferred embodiment, those skilled in the art will recognize that the invention can be practiced with modification within the spirit and scope of the appended claims.

The invention claimed is:

1. An optical switch with positional detection, comprising:
   a key cap adjoined to a key stem;
   an emitter to emit an emitted beam;
   a detector for detecting said emitted beam;
   a microprocessor for receiving signals from said detector, said signals pertaining to attenuation from said emitted beam detected by said detector;
   said key stem moves in a downward direction protruding through and being constrained in a lateral direction by a sliding surface;
   said key stem having a lower surface;
   said microprocessor calculates an interim downward position of said key stem;
   said microprocessor calculates velocity of said key stem in said downward direction to said interim downward position where said velocity calculations stop, and said microprocessor transmits velocity codes representative of said key stem velocity to said interim downward position to a host; and
   said microprocessor, after said velocity calculations of said key stem movement to said interim downward position are transmitted to said host, calculates after pressure changes in said key stem position in an upward direction or a downward direction from said interim downward position and transmits after pressure codes representative of said after pressure changes to said host.

2. An optical switch with positional detection as claimed in claim 1, further including
   a second emitter to emit a second emitted beam to a second detector disposed substantially ninety degrees relative to said first emitter; and
   said key stem having an optical opening with sides parallel to said downward direction to pass said second emitted beam during movement of said key stem in said downward direction.

3. An optical switch with positional detection as claimed in claim 2, wherein
   said key stem pivots in a lateral direction allowing said sides to side attenuate said second emitted beam;
   whereas said key stem has at least one side position after said lateral direction starts to move prior to said key stem contacting said constraining sliding surface; and
   said microprocessor transmits codes representative of said side attenuation to said host.

4. An optical switch with positional detection as claimed in claim 1 wherein said key cap is part of a keyboard for a computer.

5. An optical switch with positional detection as claimed in claim 1 wherein said key cap is part of a musical instrument.

6. An optical switch with positional detection as claimed in claim 1 wherein said key cap is part of a foot switch.

7. An optical switch with positional detection as claimed in claim 1 further including means to output one or more of said depth and acceleration to a host.

8. An optical switch with positional detection as claimed in claim 3 further including
   means to determine said key stem is in oscillation in said second emitted beam, and means to output a measure of said oscillation to a host.

9. An optical switch with positional detection as claimed in claim 1, further including
   a tensioning element to restrain said downward position of said key stem while in said emitted beam giving a first attenuation point; and
   whereas when more pressure is applied to said key stem said tensioning element allowing said key stem to move to at least one more attenuation point.

10. An optical switch with lateral positional detection, comprising:
    a key cap adjoined to a key stem;
    said key stem moves in a lateral direction to a side surface;
    an emitter to emit an emitted beam to a detector;
    an optical opening in said key stem with two sides perpendicular to said lateral direction, said optical opening in said key stem passes said emitted beam from said emitter to said detector;
    said key stem, said emitter and said detector being configured such that when said key stem moves in said lateral direction, one of said two sides of said key stem to laterally attenuates said emitted beam;
    a circuit with a microprocessor for detecting said attenuation of said emitted beam by said key stem from prior to said lateral movement starting to said key stem contacting said side surface; and
    whereas when said key stem's lateral movement contacts said side surface or stops prior to said key stem contacting said side surface, the attenuation at that point and a key code indicative of said key cap is transmitted to a host.

11. An optical switch with lateral positional detection as claimed in claim 10 wherein
    said key stem moves in a downward direction;
    said optical opening in said key stem has an optical opening top;
    said optical opening top is sensed by attenuation of said emitted beam;
    said microprocessor calculates an interim downward position of said optical opening top;
    said microprocessor calculates velocity of said optical opening top in said downward direction to said interim downward position where said velocity calculations stop, and said microprocessor transmits velocity codes representative of said optical opening top velocity to said interim downward position are transmitted to a host; and
    said microprocessor, after said velocity calculations are transmitted to said host, calculates after pressure changes in said optical opening top position in an upward direction or an downward direction from said interim downward position and transmits after pressure codes representative of said after pressure changes to said host.

12. An optical switch with lateral positional detection, comprising:
    a key cap adjoined to a key stem;
    said key stem moves in a downward direction protruding through and being constrained in a lateral direction by a sliding surface;
    an emitter to emit an emitted beam to a detector;
    said key stem having a lower surface;
    an optical opening in said key stem with two sides parallel to said downward direction to pass said emitted beam;
    said key stem being pivotable in a lateral direction allowing said sides to laterally attenuate said emitted beam;
    a circuit with a microprocessor for detecting said attenuation of said emitted beam caused by pivoting of said key stem;
    said microprocessor transmits codes representative of said attenuation to a host; and a second emitter to emit a second emitted beam to a second detector being substantially ninety degrees relative to said first emitter;

said key stem having a second optical opening to pass said second emitted beam during movement of the key stem in the downward direction; and said second optical opening having sides parallel to said downward direction.

13. An optical switch with lateral positional detection as claimed in claim 12, further including said key stem pivots in a second lateral direction allowing said second sides to secondly laterally attenuate in a second lateral direction said second emitted beam; and whereas said key stem has at least one side position after said lateral direction starts prior to said key stem reaching said sliding surface.

14. An optical switch with positional detection as claimed in claim 11, further including a tensioning element to restrain said downward position of said key stem while in said emitted beam giving a first attenuation point; and whereas when more pressure is applied to said key stem said tensioning element allowing said key stem to move to at least one more attenuation point.

15. An optical switch with lateral positional detection as claimed in claim 12, wherein said circuit scans said second emitter and said second detector, and detects when said optical opening side is laterally positioned in said second emitted beam and outputs at least one said second lateral position to a host.

16. An optical switch with lateral positional detection as claimed in claim 10 further including means to calculate a velocity of said key stem based on changes in attenuation of said emitted beam, and means to output said velocity to a host.

17. An optical switch with lateral positional detection as claimed in claim 11 further including means to calculate an acceleration of said key stem based on changes in attenuation of said emitted beam, and means to output said acceleration to a host.

18. An optical switch with lateral positional detection as claimed in claim 10 further including means to determine said key stem is in oscillation in said second emitted beam, and means to output a measure of said oscillation to a host.

19. An optical switch with lateral positional detection as claimed in claim 10 wherein said key cap is part of a keyboard for a computer.

20. An optical switch with lateral positional detection as claimed in claim 10 wherein said key cap is part of a musical instrument.

21. An optical switch with lateral positional detection as claimed in claim 10 wherein said key cap is part of a foot switch.

22. An optical switch with lateral positional detection as claimed in claim 10 further including means to output said lateral position as at least one function to a host.

23. An optical switch with lateral positional detection as claimed in claim 12 further including means to triangulate said lateral direction and said second lateral direction to give cursor direction, and means to output said cursor direction to a host.

24. An optical switch with positional detection as claimed in claim 1 further including said lower surface having serrations to laterally attenuate said emitted beam; and whereas the amount of said lateral attenuation equating to at least one sideward position in said emitted beam.

25. An optical switch with lateral positional detection as claimed in claim 10 comprising:

a second emitter to emit a second emitted beam to a second detector being substantially ninety degrees relative to said first emitter;

said key stem having a second optical opening to pass said second emitted beam during movement of said key stem in a second lateral direction; and said second optical opening having sides perpendicular to said second lateral direction.

26. An optical switch with lateral positional detection as claimed in claim 25 further including means to triangulate said lateral direction and said second lateral direction to give cursor direction, and means to output said cursor direction to a host.

* * * * *